(12) United States Patent
Stiles et al.

(10) Patent No.: US 7,582,228 B2
(45) Date of Patent: *Sep. 1, 2009

(54) BARIUM THIOALUMINATE PHOSPHOR MATERIALS WITH NOVEL CRYSTAL STRUCTURES

(75) Inventors: James Alexander Robert Stiles, Toronto (CA); Morad Kamkar, Maple (CA)

(73) Assignee: iFire IP Corporation, Fort Saskatchewan, Alberta (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/191,704

(22) Filed: Aug. 14, 2008

(65) Prior Publication Data

US 2008/0296533 A1    Dec. 4, 2008

Related U.S. Application Data

(63) Continuation of application No. 11/196,163, filed on Aug. 3, 2005, now Pat. No. 7,427,367.

(60) Provisional application No. 60/599,036, filed on Aug. 6, 2004.

(51) Int. Cl.
  C09K 11/56 (2006.01)
  C09K 11/64 (2006.01)
  C09K 11/55 (2006.01)
(52) U.S. Cl. .............................................. 252/301.4 S
(58) Field of Classification Search ............ 252/301.4 S
See application file for complete search history.

(56) References Cited

U.S. PATENT DOCUMENTS

| 3,801,702 | A | 4/1974 | Donohue et al. |
| 4,524,300 | A | 6/1985 | Rutten et al. |
| 5,270,298 | A | 12/1993 | Ramesh |
| 5,561,006 | A | 10/1996 | Lecerf et al. |
| 5,576,564 | A | 11/1996 | Satoh et al. |
| 7,427,367 | B2 * | 9/2008 | Stiles et al. ........... 252/301.4 S |
| 2002/0094451 | A1 | 7/2002 | Li et al. |
| 2002/0122895 | A1 | 9/2002 | Cheong et al. |

(Continued)

FOREIGN PATENT DOCUMENTS

CA    2431084 A1    7/2002

(Continued)

OTHER PUBLICATIONS

B. Eisenmann et al., "Die Strukturen Von $BaGa_2S_4$ Und $BaAl_2S_4$", Materials Research Bulletin, 1982, vol. 17, p. 1169; Pergamon Press Ltd.

(Continued)

Primary Examiner—C. Melissa Koslow
(74) Attorney, Agent, or Firm—Fay Sharpe LLP

(57) ABSTRACT

The present invention provides thioaluminate phosphor compounds $BaAl_2S_4$ and $BaAl_4S_7$ with novel crystal structures that have higher luminosity and improved color coordinates. The invention is also directed to rare earth element activated barium thioaluminate phosphor films comprising a phosphor compound having a novel crystal lattice structure that increases the electroluminescent light emission from the film. The phosphor films are for use in electroluminescent displays and in particular, thick film dielectric electroluminescent displays.

15 Claims, 10 Drawing Sheets

U.S. PATENT DOCUMENTS

| | | |
|---|---|---|
| 2003/0146691 A1 | 8/2003 | Yano et al. |
| 2003/0224221 A1 | 12/2003 | Cheong et al. |
| 2004/0013906 A1 | 1/2004 | Stiles et al. |
| 2004/0027048 A1 | 2/2004 | Cheong et al. |
| 2004/0028957 A1 | 2/2004 | Cheong |
| 2004/0135495 A1 | 7/2004 | Wu et al. |

FOREIGN PATENT DOCUMENTS

| | | |
|---|---|---|
| CA | 2447626 A1 | 12/2002 |
| CA | 2469538 A1 | 7/2003 |
| CA | 2478439 A1 | 10/2003 |
| CA | 2482833 A1 | 10/2003 |
| CA | 2495771 A1 | 3/2004 |
| EP | 0 740 490 | 6/2001 |

OTHER PUBLICATIONS

B. Eisenmann et al., "Zur Kenntnis von $BaAl_4S_7$, Und $BaGa_4S_7$", *Revue de Chimte Minerale*, 1983, vol. 20, p. 329; Gauthier-Villars.

Smet et al., "Crystallographic and Luminescent Properties of Orthorhombic $BaAl2S4$:Eu Power and Thin Films", Jour. App. Phys., 98, 43512, pp. 1-6, Aug. 22, 2005.

Inoue Y et al: "Atomic Composition And Structural Properties Of Blue Emitting $BaAl_2S_4$:Eu Electroluminescent Thin Films" Japanese Journal Of Applied Physics, Japan Society Of Applied Physics, Tokyo, JP, vol. 40, No. 4A, Part 1, Apr. 2001, pp. 2451-2455.

Dan Cheong et al: "9.3: $Mg_xBa_{1-x}Al_2S_4$: Eu Blue Phosphor In Thick Dielectric EL" Sid Symposium Digest Of Technical Papers, vol. XXXIII, May 2002, pp. 105-107.

Kawanishi M. et al: "Eu2+-Doped Barium Thioaluminate El Devices Prepared By Two-Target Pulsed-Electron-Beam Evaporation" Journal Of The Society For Information Display, Society For Information Display, San Jose, US, vol. 8, No. 3, Dec. 1, 1999, pp. 247-251.

* cited by examiner

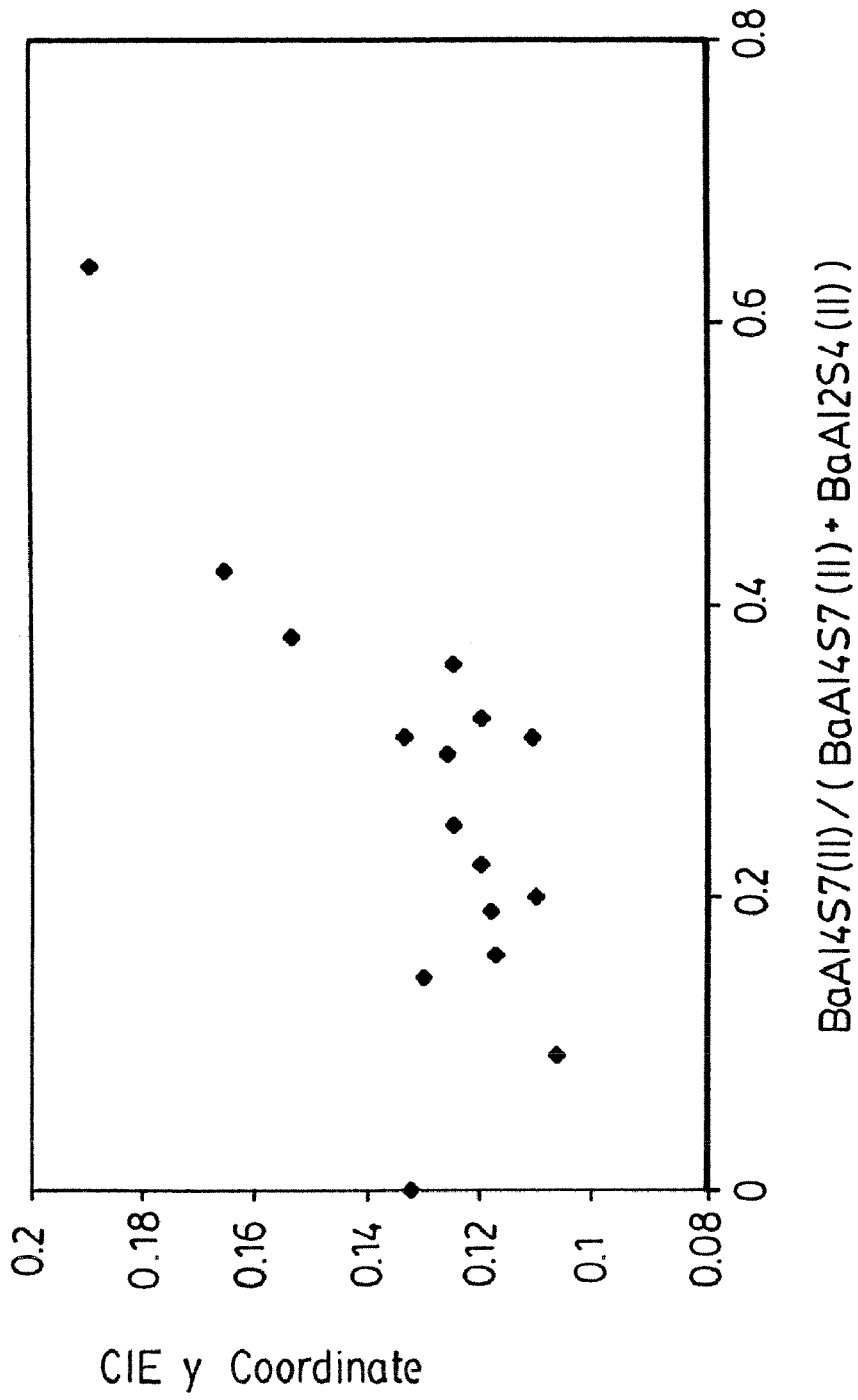
FIG. 9. CIE y Coordinate as a Function of the Ratio of BaAl4S7(II) to the sum of BaAl4S7(II) and BaAl2S4(II)

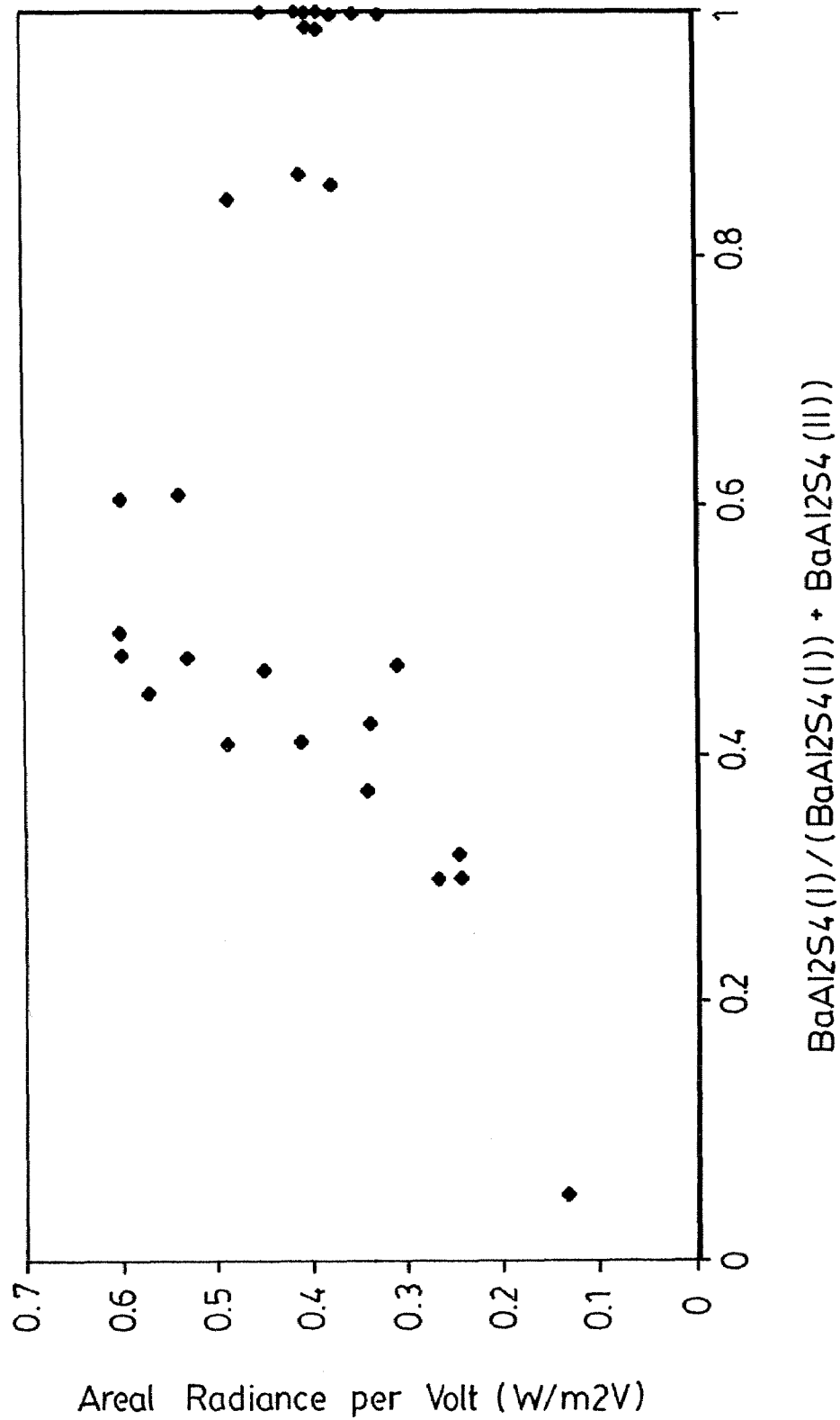

BARIUM THIOALUMINATE PHOSPHOR MATERIALS WITH NOVEL CRYSTAL STRUCTURES

This is a continuation of U.S. application Ser. No. 11/196,163, filed Aug. 3, 2005 U.S. Pat. No. 7,427,367, granted Sep. 23, 2008, entitled "BARIUM THIOALUMINATE PHOSPHOR MATERIALS WITH NOVEL CRYSTAL STRUCTURES", and which application claims the benefit of U.S. Provisional Application Ser. No. 60/599,036, filed Aug. 6, 2004, the disclosures of which are hereby incorporated by reference in their entirety.

FIELD OF THE INVENTION

The present invention relates to improving the luminance and energy efficiency of barium thioaluminate phosphors. More specifically, the present invention provides novel thioaluminate phosphors with novel crystal structures exhibiting higher luminosity and improved colour coordinates.

BACKGROUND TO THE INVENTION

Traditionally, europium activated barium thioaluminate or barium magnesium thioaluminate thin film phosphors have been used in thick film dielectric electroluminescent displays. While the performance of these phosphor materials has been substantially enhanced with the use of advanced deposition and crystallization methods as well as through improvements to the overall display structure, particularly to the provision of chemical barrier layers and electron injection enhancement layers adjacent to the phosphor film, it is still desirable to have a phosphor material with a higher luminance and energy efficiency than that afforded by these phosphor materials as they are known in the art.

The $BaAl_2S_4$ and $BaAl_4S_7$ compounds of the prior art have each have been identified to have one crystal structure. For $BaAl_2S_4$, referred to herein as $BaAl_2S_4$ (I), this is a cubic lattice with a lattice constant a of 12.65 Angstrom units and containing 12 $BaAl_2S_4$ molecules in the crystal unit cell arranged according to the crystal symmetry-defining Hermann Mauguin space group Pa-3. The definition of the Hermann Mauguin space groups can be found in the Lawrence Livermore National Laboratory (LLNL) website http://www.structure.llnl.gov/xray/comp/space instr.htm. The crystal structure of this compound as described above and determined from x-ray diffraction data is published in Materials Research Bulletin Volume 17 (1992), page 1169. This crystal structure for $BaAl_2S_4$(I) is characterized in having an x-ray diffraction reflection at a diffraction angle of $\theta$=at 15.7 degrees and at 23.3 degrees when Cu K$\alpha$ x-rays are used to generate the diffraction data. This crystal structure has 12 atomic sites containing a barium atom, 8 of which are equivalent by symmetry elements of the space group and the remaining 4 of which are also related by symmetry elements of the space group, but the two groups of barium atoms occupy atomically inequivalent sites in the crystal lattice. It is understood that if the compound is doped with europium, which is chemically similar to barium, the europium atoms will occupy atomic sites normally occupied by barium atoms, and so there are two distinct types of sites that the europium atoms may occupy, thus giving rise to different electroluminescent emission characteristics from the europium corresponding to each type of site.

The previously known crystal structure for BaAl4S7, herein referred to as BaAl4S7 (I), has an orthorhombic lattice with lattice constants a=14.81 Angstroms, b=6.22 Angstroms and c=5.89 Angstroms and contains 2 BaAl4S7 molecules in the crystal unit cell arranged according to the crystal symmetry-defining Hermann Mauguin space group P m n 21. This crystal structure has two atomic sites containing barium in the unit cell that are related to each other by the symmetry elements of the space group, so there is only one type of site into which europium can be substituted. The crystal structure of this compound has been determined from x-ray diffraction data as described in Eisenmann et al in Rev. Chim Miner. Volume 20 (1983), pg. 329. It density as calculated from the crystallographic data is 2.88 grams per cubic centimeter.

The performance of phosphor materials may be enhanced if the elemental composition of a deposited film is commensurate with the stoichiometry of the desired phosphor compound, however, the prior art does not anticipate the existence of more than one crystal phase for a given stoichiometry, nor does it teach or suggest the performance advantage that can be realized by ensuring that the phosphor material is formed from a preferred crystal phase or a mixture of preferred crystal phases.

It is therefore desirable to provide barium thioaluminate phosphor compounds with increased electroluminescent light emission compared to those of the prior art.

SUMMARY OF THE INVENTION

The present invention provides novel blue-emitting barium thioaluminate phosphor compounds and compositions with novel crystal structures for full colour ac electroluminescent displays for use as phosphor films, the phosphor films having a higher luminosity and improved colour coordinates over barium thioaluminate phosphor film materials having a crystal structure as known in the art.

According to an aspect of the present invention are rare earth element activated barium thioaluminate phosphor films comprising a crystal lattice structure that increases the electroluminescent light emission from said compounds.

According to an aspect of the present invention is a rare earth element activated barium thioaluminate phosphor film comprising a compound having a crystal lattice structure that increases the electroluminescent light emission from said film.

According to another aspect of the present invention is a rare earth element activated barium thioaluminate phosphor film comprising one or more compounds having a crystal lattice structure that increases the electroluminescent light emission from said film.

According to still a further aspect of the present invention are rare earth element activated barium thioaluminate phosphor films comprising a compound having a crystal lattice structure that increases the electroluminescent light emission from said compound, wherein said compound has a blue emission peak wavelength of about 475 to about 495 nm.

According to another aspect of the present invention are rare earth element activated barium thioaluminate phosphor compositions comprising one or more barium thioaluminate phosphor compounds having a crystal structure that increases the electroluminescent light emission from said compounds.

According to a further aspect of the present invention is a rare earth element activated BaAl2S4 phosphor compound having a face centered orthorhombic crystal lattice structure.

According to another aspect of the present invention is a rare earth element activated BaAl4S7 phosphor compound having a face centered orthorhombic crystal lattice structure.

In aspects, these phosphor compounds are doped with a rare earth element as an activator which is selected from the group consisting of europium and cerium. In further aspects, the rare earth element is europium.

According to still a further aspect of the present invention is a blue light emitting rare earth element activated barium thioaluminate phosphor composition, the composition comprising a mixture of one or more of the following:
(a) $BaAl_2S_4$ (I) phosphor compound having a cubic lattice crystal structure;
(b) $BaAl_2S_4$ (II) phosphor compound having a face centered orthorhombic crystal lattice structure;
(c) $BaAl_4S_7$ (I) phosphor compound having an orthorhombic crystal lattice structure: and
(c) $BaAl_4S_7$ (II) phosphor compound having a face centered orthorhombic crystal lattice structure,
wherein said composition comprises at least (b) or (d).

According to yet another aspect of the present invention is a rare earth element activated blue light emitting barium thioaluminate phosphor composition, the composition comprising a mixture of:
(a) $BaAl_2S_4$ (I) compound having a cubic lattice crystal structure; and
(b) $BaAl_2S_4$ (II) compound having a face centered orthorhombic crystal lattice structure.

In aspects, the composition has a mole fraction of (b) to [(b)+(a)] in the range of about 0.3 to 0.9.

According to yet another aspect of the present invention is a blue light emitting europium activated barium thioaluminate phosphor film, said phosphor film comprising a mixture of BaAl2S4 (I) and BaAl2S4 (II).

According to still another aspect of the present invention is a blue light emitting rare earth element activated barium thioaluminate phosphor composition, the composition comprising a mixture of:
(a) $BaAl_2S_4$ (II) compound having a face centered orthorhombic crystal lattice structure; and
(b) $BaAl_4S_7$ (II) compound having a face centered orthorhombic crystal lattice structure.

In any of the aforementioned aspects, the rare earth element activator comprises europium.

In any of the aforementioned aspects, the compounds of the invention may further comprise oxygen partially substituted for sulfur in the crystal lattice structure.

In any of the aforementioned aspects, the compounds of the invention may further comprise an element from Group IIA of the Periodic Table of Elements partially substituted for barium in the crystal lattice structure.

It is understood by one of skill in the art, that the phosphor compounds of the invention may comprise any combination of a rare earth activator and an element from Group IIA of the Periodic Table of Elements partially substituted for barium and oxygen partially substituted for sulfur.

In aspects, the invention encompasses methods of depositing a phosphor film comprising one or more rare earth element activated barium thioaluminate phosphor compounds, wherein at least one of said one or more phosphor compounds has a crystal structure that increases the electroluminescent light emission from said phosphor film.

According to still further aspects of the present invention, are novel phosphor compounds having the formula BaAl2S4-xOx, where x is sufficiently small that substitution of sulfur with oxygen does not precipitate a second crystal phase.

According to still further aspects of the present invention, are novel phosphor compounds having the formula BaAl4S7-xOx, where x is sufficiently small that substitution of sulfur with oxygen does not precipitate a second crystal phase.

In aspects of the invention the rare earth element activator for any of the barium thioaluminate compounds or compositions of the invention is europium. In such aspects, the phosphor compounds are represented as Ba1-xRExAl2S4 and Ba1-xRExAl4S7, where there is a partial substitution of barium with a rare earth element that acts as a luminescent center in the phosphor and further where the value of x is sufficiently small that there is no precipitation of a second crystal phase.

In still other aspects of the invention are phosphor compounds of the present invention that have a partial replacement of barium with an element M to form Ba1-xMxAl2S4 and Ba1-xMxAl4S7. M is selected from Group IIA or Group IIB of the Periodic Table of Elements and x is sufficiently small to not precipitate a second crystal phase.

In still other aspects, the rare earth element activated barium thioaluminate compounds or compositions of the invention are incorporated as phosphor films in electroluminescent displays and in particular in thick film dielectric electroluminescent displays.

Other features and advantages of the present invention will become apparent from the following detailed description. It should be understood, however, that the detailed description and the specific examples while indicating embodiments of the invention are given by way of illustration only, since various changes and modifications within the spirit and scope of the invention will become apparent to those skilled in the art from said detailed description.

BRIEF DESCRIPTION OF THE DRAWINGS

The present invention will become more fully understood from the detailed description given herein and from the accompanying drawings, which are given by way of illustration only and do not limit the intended scope of the invention.

FIG. 9 shows the dependence of the 1931 CIE y coordinate of electroluminescent devices having phosphor films containing $BaAl_2S_4$ (II) and $BaAl_4S_7$(II) as a function of the relative concentration of the two phases; and FIG. 10 shows the dependence of the areal radiance of electroluminescent devices having phosphor films containing $BaAl_2S_4$ (I) and $BaAl_2S_4$ (II) as a function of the relative concentration of the two phases.

DETAILED DESCRIPTION OF THE INVENTION

Figure 1:
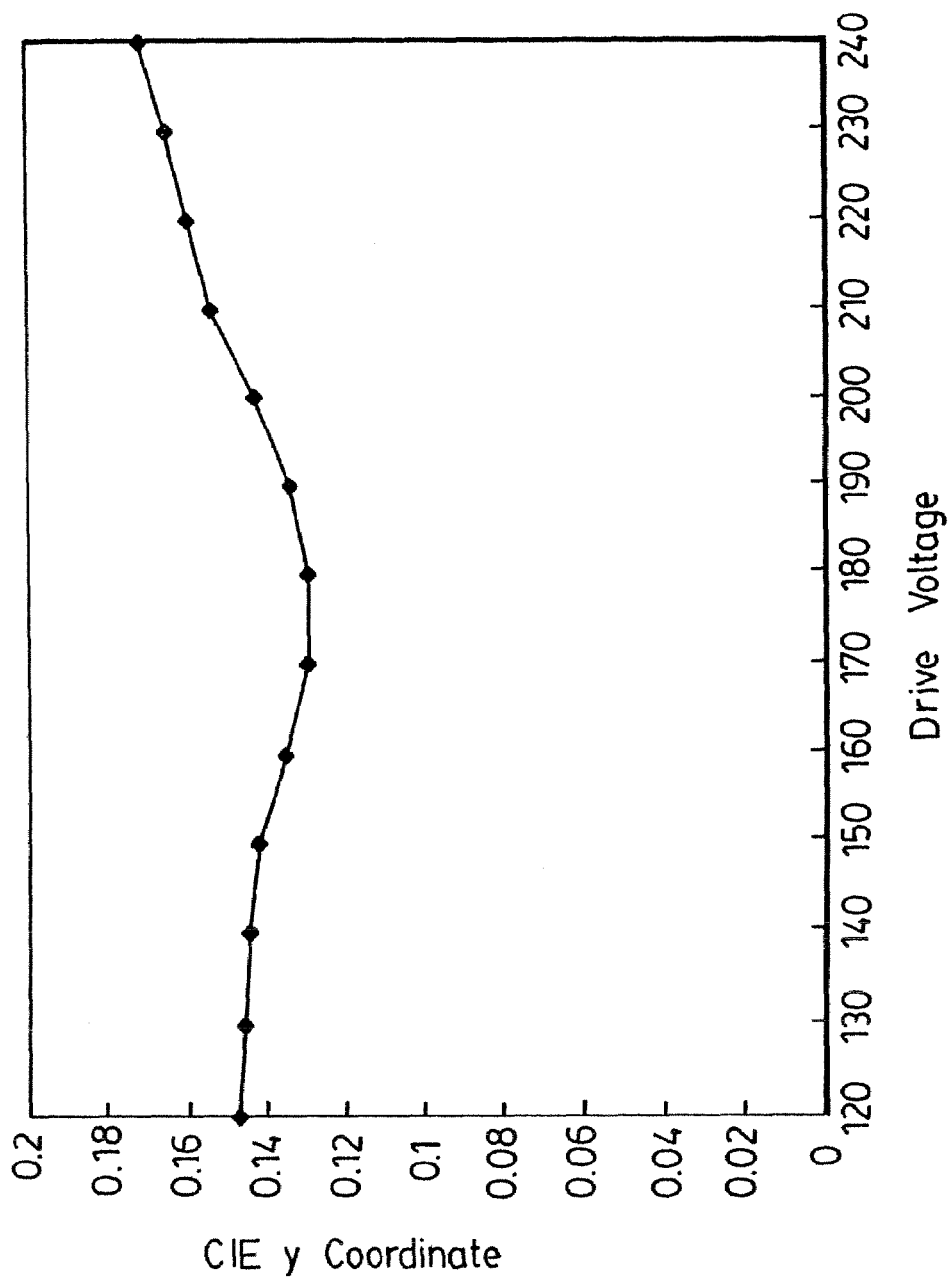
FIG. 1 shows the CIE y coordinate of a the electroluminescent emission from a multi-phase barium thioaluminate phosphor film.

The present invention relates to improving the luminance and energy efficiency of barium thioaluminate phosphors by causing them to crystallize with a crystal structure that increases the electroluminescent light emission from the phosphors. The Applicant has now developed novel barium thioaluminate phosphor compounds that exhibit an increased light emission and improved colour compared to compounds of the prior art. The compounds are deposited as thin film phosphors in electroluminescent devices.

In an aspect of the invention, the Applicant has developed $BaAl_2S_4$ phosphor compounds with a novel crystal structure. This novel structure, herein referred to as $BaAl_2S_4$ (II) has a face centered orthorhombic crystal lattice with lattice constants a=21.91 Angstroms, b=20.98 Angstroms and c=12.13 Angstroms and contains 32 $BaAl_2S_4$ molecules in the crystal unit cell arranged according to the crystal symmetry-defining Hermann Mauguin space group F d d d. Face centered crystal structures are characterized in that the Miller indices h, k and l for them, usually denoted using the notation (hkl), and where h, k and l are integers, as defined for example in Kittel, Solid State Physics, third edition page 21, are either all even or all odd, resulting in x-ray diffraction patterns with a relatively small number of reflections. The $BaAl_2S_4$ (II) crystal structure has 32 atomic sites containing a barium atom in the unit cell, a group of 16 that are equivalent by symmetry elements of the space group, a further group of 8 that are equivalent by symmetry elements of the space group, but distinct from the first group, and a remaining group of 8 that are equivalent by symmetry but distinct from the first and second groups. Thus the structure has 3 types of sites into which europium can be substituted with relative population ratios of 2:1:1. The crystal structure can be confirmed by powder x-ray diffraction data.

In a further aspect of the invention, the Applicant has also developed $BaAl_4S_7$ phosphor compounds with a novel crystal structure. This novel structure, herein referred to as $BaAl_4S_7$ (II), has a face centered orthorhombic crystal lattice structure. This novel crystal lattice structure that has an x-ray diffraction reflection at a diffraction angle of θ=at 16.8 degrees but not at 23.3 degrees when Cu Kα x-rays are used to generate the diffraction data. This can be confirmed by analysis of powder X-ray diffraction. It does have a reflection with a relatively small amplitude at θ=at about 23.7 degrees, which by normal x-ray diffraction techniques is a distinguishably greater angle than 23.3 degrees. One crystal structure that is consistent with the diffraction data has lattice constants a=10.6 Angstroms, b=7.3 Angstroms and c=10.5 Angstroms and contains 4 $BaAl_4S_7$ molecules in the crystal unit cell arranged according to the crystal symmetry-defining Hermann Mauguin space group F m m 2. This structure has a substantially higher calculated density of 3.78 grams per cubic centimeter as compared to 2.88 grams per cubic centimeter for the $BaAl_4S_7$ (I) structure known in the art and there does not appear to be an analogous barium thiogallate structure, possibly because the atomically higher density structure will not accommodate the gallium ions, which are somewhat larger than aluminum ions. The $BaAl_4S_7$ (II) structure has 4 atomic sites containing barium in the unit cell that are all related to each other by the symmetry elements of the space group and therefore has only one type of site into which europium can be substituted.

The invention encompasses the novel crystal structure phosphor compounds having partial substitution in the crystal lattice of sulfur with oxygen or selenium, expressed as $BaAl_2S_{4-x}O_x$, $BaAl_4S_{7-x}O_x$, $BaAl_2S_{4-x}Se_x$ or $BaAl_4S_{7-x}Se_x$ where the value of x is sufficiently small that substitution of sulfur with oxygen does not cause precipitation of a second crystal phase.

The invention also encompasses the novel crystal structure phosphor compounds expressed as $Ba_{1-x}RE_xAl_2S_4$ and $Ba_{1-x}RE_xAl_4S_7$ having partial substitution of barium with a rare earth element (RE) such as europium used as a luminescent center in the phosphor film materials, and wherein the value of x is sufficiently small that precipitation of a second crystal phase does not occur.

The invention further encompasses the partial replacement of barium in the novel phosphor compounds of the invention with an element M from Group IIA of the Periodic Table of Elements to form the related materials expressed as Ba1-xMxAl2S4 and Ba1-xMxAl4S7 where M is an element selected from Group IIA or Group IIB of the Periodic table of Elements for the purpose of modifying the emission characteristics of the phosphor film or modifying the deposition and crystallization conditions for the phosphor film, provided that the value of x is sufficiently small that said replacement does not cause precipitation of a second crystal phase. The partial substitution of these elements for barium in the crystal lattices for BaAl2S4 (II) and BaAl4S7 (II) may only slightly alter the lattice constant for these phases, resulting in small shifts in the diffraction angles, and in the relative intensity of the diffracted beams.

In general, the novel phosphor compounds and compositions of the present invention may be deposited as a phosphor thin film onto a suitable substrate by a variety of known methods such as, for example, sputtering, electron beam deposition and chemical vapour deposition. Sputtering, in aspects, is the preferred method. Sputtering is conducted in an atmosphere comprising argon and hydrogen sulfide at a working pressure in the range of about 0.05 to 2 Pa and also containing oxygen at a partial pressure of less than about 0.05 percent of the working pressure. The required hydrogen sulfide partial pressure depends on the chemical composition of the sputtering targets used, with the use of metallic targets requiring partial pressures towards the upper end of the range and the use of sulfide targets requiring lower partial pressures. The film substrate is maintained at a temperature between ambient temperature and about 300° C. at a deposition rate in the range of about 5 to 100 Angstroms per second. The atomic ratio of the barium to aluminum in the source material is adjusted by means known in the art to provide the desired ratio in the deposited film in the range of about 1:2 to 1:4. The provision of the novel crystal structures for the barium thioaluminate phosphor compounds of the invention is dependent on a variety of conditions of the deposition process such as for example: substrate nature, substrate temperature, deposition rate, type and concentration of dopant, pressure and composition of vacuum environment. One of skill in the art could readily examine the deposited phosphor film and confirm by methods such as x-ray diffraction analysis that the film has in fact the desired novel crystal structure in accordance with the present invention.

More specifically, the invention is made by controlling the deposition conditions, particularly the relative proportions of aluminum, barium, sulfur and oxygen and other elements such as hydrogen during appropriate points of the deposition process.

The BaAl4S7 (II) compound is formed by providing a ratio of aluminum to barium of 4:1 in the phosphor compound, recognizing that not all of the deposited aluminum will be available to form the BaAl4S7 (II) compound because some of it preferentially reacts with oxygen in the deposited phosphor or in adjacent layers to form Al2O3, or with oxygen and hydrogen to form Al(OH)3. Therefore a ratio of aluminum to barium greater than 4:1 must be deposited to account for reaction of aluminum with oxygen to form aluminum oxide or related compounds. The optimum condition must be determined experimentally, depending on the quantity of oxygen or hydroxide available from the adjacent layers or co-deposited with the phosphor film. Further, the BaAl4S7 (II) should not be exposed to oxygen or water once it is formed as this may lead to decomposition thereof.

The conditions to form BaAl2S4 (I) and BaAl2S4 (II) require a smaller ratio of aluminum to barium of 2:1, still recognizing that not all of the aluminum will be available to form the compounds, but will react with oxygen and hydrogen to form Al2O3 or Al(OH)3, and thus the correct ratio must be experimentally determined through optimization of the process as described above. Typically, following deposition, the phosphor material is BaAl2S4 (II). The ratio of BaAl2S4 (I) to BaAl2S4 (II) when providing a mixture thereof can be controlled by post treatment of the deposited under an oxygen-containing atmosphere with processing time and oxygen content as variables to convert some of the BaAl2S4 (II) to BaAl2S4 (I). While the BaAl2S4 (I) compound is known in the prior art, controlled mixtures of BaAl2S4 (I) and BaAl2S4 (II) are not.

As described supra, the controlled doping of BaAl2S4 or BaAl4S7 with certain impurities can influence which of the crystal structures is formed in a deposited phosphor film. For example doping of BaAl2S4 with a controlled concentration of magnesium during phosphor film deposition causes preferential crystallization of the BaAl2S4 (II) crystal structure. Also annealing of the deposited film under an oxygen-containing atmosphere causes conversion of the BaAl2S4 (II) crystal structure to the BaAl2S4 (I) crystal structure. Notwithstanding the above, the introduction of too much impurity will cause the co-crystallization of one or more additional crystal phases, which is generally undesirable. One skilled in the art can determine the tendency, if any, for other impurities selected from the Periodic Table of Elements to cause preferential crystallization in the phosphor film.

In aspects of the invention there is provided a phosphor composition which may comprise various mixtures of the phosphor compounds of the invention as well as the phosphor compounds of the prior art. This is because the different compounds have different properties which in combination are beneficial. For example, the BaAl2S4 (I) compound has the most suitable blue emission spectrum for display applications with a peak emission wavelength of about 475 nm and the BaAl4S7 (II) compound has the highest luminance and radiance and a longer wavelength, but still acceptable blue emission peak in the range of 485 to 495 nm. Thus in aspects of the invention, a mixture of the compounds to provide a phosphor composition may provide an optimum combination of high luminance and optimum CIE colour coordinate. The novel phosphor compositions comprising the novel phosphor compounds of the present invention, either alone or in combination with the phosphor compounds of the prior art may for example, encompass novel phosphor compositions comprising one or more of: (a) BaAl2S4 (I) phosphor compound having a cubic lattice crystal structure; (b) BaAl2S4 (II) phosphor compound having a face centered orthorhombic crystal lattice structure; (c) BaAl4S7 (I) phosphor compound having an orthorhombic crystal lattice structure: and (d) BaAl4S7 (II) phosphor compound having a face centered orthorhombic crystal lattice structure. In one aspect the composition may comprise a mixture of: (a) BaAl2S4 (I) compound having a cubic lattice crystal structure; and (b) BaAl2S4 (II) compound having a face centered orthorhombic crystal lattice structure. In this aspect, the composition has a mole fraction of (b) to [(b)+(a)] in the range of 0.3 to 0.9.

In one embodiment of the invention is a phosphor composition comprising a mixture of BaAl2S4 (I) and BaAl2S4 (II), this composition exhibiting higher luminance than either of BaAl2S4 (I) or BaAl2S4 (II) alone. In an aspect of the invention, the two crystal phases have a grain size in the range of 5 to 30 nanometers and are substantially homogeneously distributed throughout the phosphor film.

In another embodiment of the invention is a phosphor composition comprising BaAl4S7 (II) which provides a higher energy conversion efficiency (ratio of total integrated radiance energy to total electrical energy input to a pixel) than BaAl2S4 (I) or BaAl2S4 (II) or mixtures of any combination of the compounds. Although BaAl4S7 provides a greenish emission that is disadvantageous for blue pixels, the green part of the emission must be filtered out, thereby negating the efficiency advantage. Nevertheless, this phosphor film material is advantageous as a primary light source for exciting red and green photoluminescent phosphors (as described for example in the Applicant's PCT application CA03/01567). This is because the green shifted spectrum provides the same quantum conversion efficiency from greenish blue to red or green as from blue to green or red using the BaAl2S4 (I) or BaAl2S4 (II) materials as primary phosphors.

Phosphor films comprising mixtures of all three phases of BaAl2S4 (I), BaAl2S4 (II) and BaAl4S7 (II) show a dependence of the emission spectrum on the applied voltage, with a relatively low y coordinate immediately above the lower threshold voltage reflective of the dominant contributions of the luminance of the BaAl2S4 (I) and BaAl2S4 (II) compounds, and a higher y coordinate at higher voltage, reflective of an increasing contribution to the luminance from the BaAl4S7 (II) compound. This trend is shown graphically in FIG. 1 for such a phosphor film. To avoid spatial variations in the colour coordinates of the light emitted from a phosphor film the phosphor phases should be homogeneously distributed throughout the film.

The threshold voltages for the various crystal compounds is dependent to a degree on the display design, but for thick dielectric electroluminescent displays incorporating these phosphor compounds, the threshold voltage for the BaAl2S4 (II) compound tends to be in the range of 160 volts to 185 volts, while the threshold voltage for the BaAl2S4 (I) compound tends to be intermediate, typically in the range 170 volts to 195 volts and the threshold voltage for the BaAl4S7 (II) compound tends to be somewhat higher, in the range of about 180 volts to 205 volts.

The present invention is suited for use as a phosphor film in an electroluminescent display or device as described for example in Applicant's WO 00/70917 (the disclosure of which is incorporated herein by reference). Such an electroluminescent device has a substrate on which are located row electrodes. A thick film dielectric is provided with a thin film dielectric thereon. The phosphor film is deposited on top of this laminated dielectric structure. An upper thin film dielectric layer is provided over top of the phosphor layer and a transparent electrode film is deposited over top of the upper dielectric layer and patterned to form pixel columns. In an alternate embodiment the phosphor layer may also be patterned to form red, green and blue sub-pixels for a full colour display.

A variety of substrates may be used, as will be understood by persons skilled in the art. In particular, the substrate is a rigid heat resistant sheet that in one aspect has deposited thereon an electrically conductive film with a thick dielectric layer deposited on the conductive film. Examples of suitable refractory sheet materials include but are not limited to ceramics such as alumina, metal ceramic composites, glass ceramic materials and high temperature glass materials. Suitable electrically conductive films are known to those of skill in the art such as, but not limited to, gold and silver alloy. The thick dielectric layer comprises ferroelectric material. The thick dielectric layer may also comprise one or more thin film dielectric layers thereon.

The following examples in the description serve to illustrate the performance advantage from a crystallized phosphor film that can be realized by constraining the crystallized phosphor to have not only a defined stoichiometry, but also a defined crystal structure or an optimally selected mixture of crystal structures. They describe means to form phosphor films comprising $BaAl2S4$ (I), $BaAl2S4$ (II) and $BaAl4S7$ (II) but are not intended to limit the scope of the invention as may be understood by one skilled in the art. The following examples also serve to illustrate that under some conditions, films containing two or more crystal phases can also have an effectively uniform threshold voltage, provided that the dimensions of the grains for each phase are small compared to the phosphor film thickness and that the concentration of any phase does not vary significantly in a direction along the surface of the phosphor film.

The above disclosure generally describes the present invention. A more complete understanding can be obtained by reference to the following specific Examples. These Examples are described solely for purposes of illustration and are not intended to limit the scope of the invention. Changes in form and substitution of equivalents are contemplated as circumstances may suggest or render expedient. Although specific terms have been employed herein, such terms are intended in a descriptive sense and not for purposes of limitation.

EXAMPLES

Example 1

A phosphor film was deposited on a silicon wafer by rf sputtering generally according to the methods taught in U.S. Pat. No. 7,282,123 (the disclosure of which is incorporated herein in its entirety). The deposition was carried out using a sputtering target consisting of a 7.6 cm diameter aluminum plate having a rectangular array of holes filled with compacted barium sulfide powder doped with 6 mole percent of europium sulfide. The ratio of the exposed nominal surface area of the barium sulfide to that of the aluminum was about 7:3. The rf power applied to the sputtering target was 200 watts. The sputtering was carried out in an atmosphere of hydrogen sulfide in argon at a pressure of 0.1 Pa. During the deposition the flow rate of argon into the sputtering chamber was 7.5 sccm and the flow rate of hydrogen sulfide was about 2.3 sccm. The thickness of the sputtered film was about 1.0 micrometers.

Figure 2:
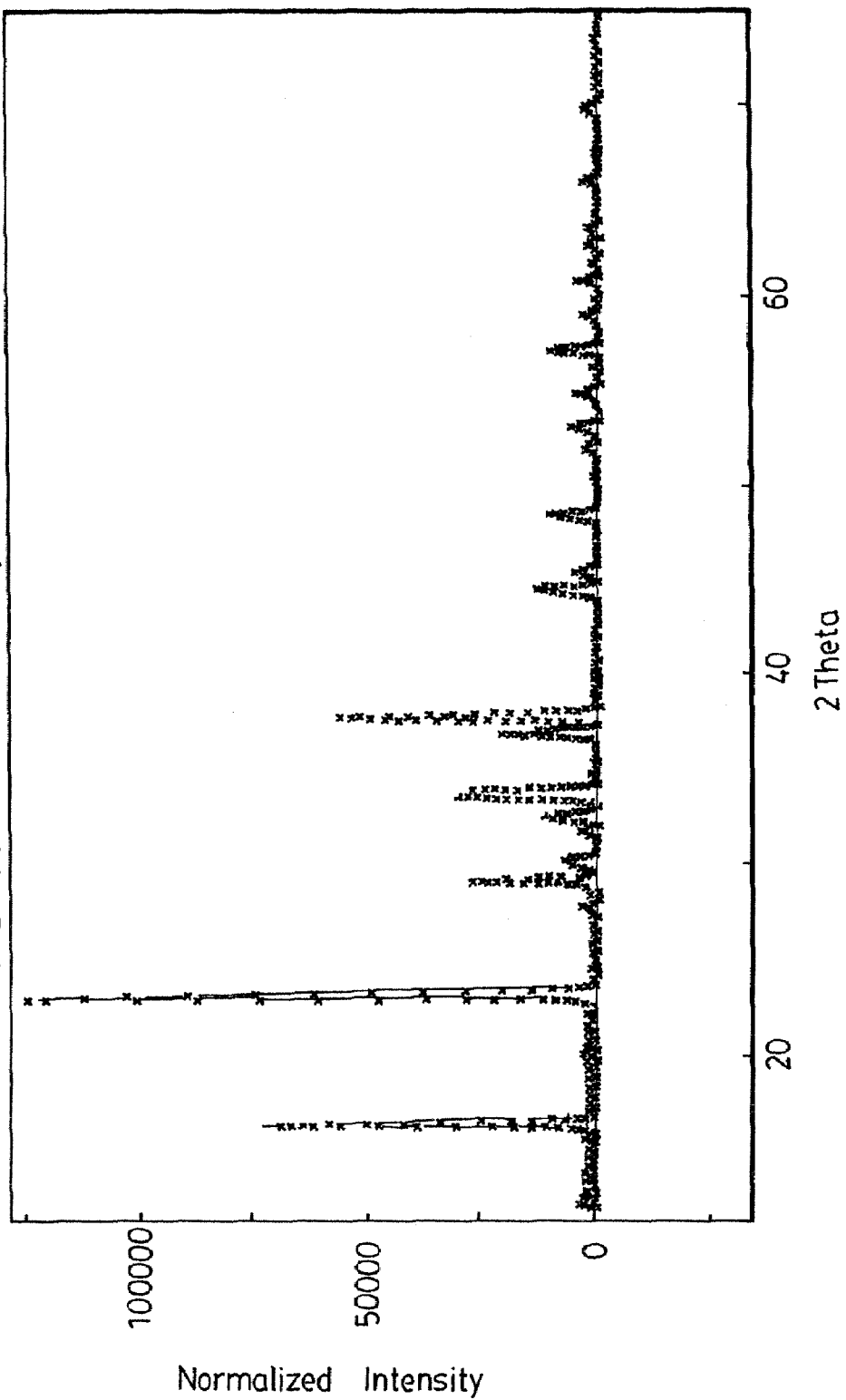
FIG. 2 shows powder x-ray diffraction data for a phosphor film comprising $BaAl_2S_4$ (II) and a curve showing the pattern calculated from the refined crystal parameters.

Following deposition the sample was thermally treated in a belt furnace under nitrogen at a peak temperature of 750° C. for about 5 minutes. According to energy dispersive analysis conducted on the deposited film following heat treatment the ratio of the atomic concentrations of aluminum to barium was 2.26:1. The deposited film was subject to X-ray diffraction analysis using a Bruker-AXS DS Discoverer x-ray diffractometer and Cu Kα x-rays with a wavelength of 1.5406 Angstroms set up to analyze the crystal structure of deposited films. The diffraction data was refined using Rietveld analysis and GSAS software developed by Los Alamos National Laboratory to obtain the previously unknown crystal structure for the dominant crystalline phase in the film. A comparison of the data to the pattern attributable to the refined crystal structure for a compound with the chemical composition $BaAl2S4$, which has been designated $BaAl2S4$ (II), is shown in FIG. 2. As can be seen from the data, there is a good fit of the refined structure to the experimental data.

Example 2

Figure 3:
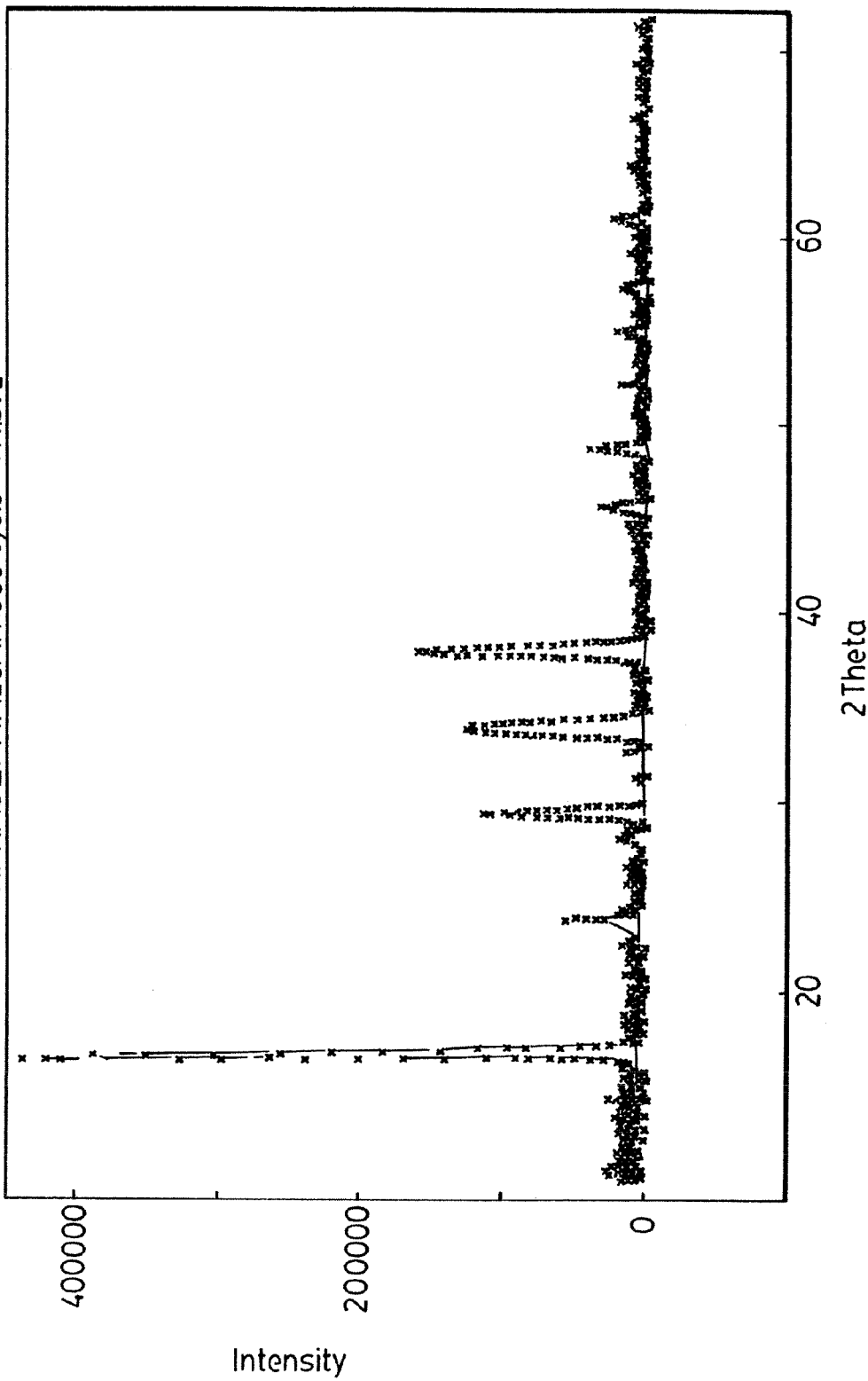
FIG. 3 shows powder x-ray diffraction data for a phosphor film comprising $BaAl_4S_7$ (II) and a curve showing the pattern calculated from the refined crystal parameters.

A phosphor film was deposited on a silicon wafer generally using electron evaporation according to the methods taught in Applicant's U.S. Pat. No. 6,610,352 and U.S. patent application Ser. No. 10/767,912 (the disclosures of which are incorporated herein in their entirety). The evaporation was carried out using four evaporation sources, two consisting of aluminum sulfide and two consisting of barium sulfide doped with about 3 atomic percent of europium sulfide. The deposition chamber was fitted with a liquid nitrogen cooled cold finger to minimize the concentration of oxygen-containing species in the deposition chamber during the deposition. Hydrogen sulfide was injected into the deposition chamber during the deposition at a rate of about 16 sccm to maintain a system pressure of 0.0005 Pascals. The deposition substrate was held at a nominal temperature of 512° C. during the deposition measured using a thermocouple fixed to a radiation shield placed behind the deposition substrate and in front of the heaters used to regulate the substrate temperature. The actual temperature of the deposition substrate was likely substantially lower than this. The deposition rate was 12 Angstroms per second and the total deposited thickness was about 0.46 micrometers. Following the deposition process the sample was annealed in a belt furnace under nitrogen at a peak temperature of 750° C. for about 4 minutes. According to energy dispersive analysis conducted on the sample following heat treatment the ratio of the atomic concentrations of aluminum to barium was about 4.5:1. The diffraction data was refined using GSAS diffraction analysis software as in example 1. Analysis showed that the sample consisted of $BaAl2S4$ (II) together with an new previously unknown crystal phase. Peaks solely attributable $BaAl2S4$ (II), including the large one at 23.3°, were deleted from the experimental data and the remaining peaks were used to refine the crystal structure of the unknown compound, with the chemical composition $BaAl4S7$, which has been designated $BaAl4S7$ (II). The comparison of the calculated diffraction pattern with the experimental data is shown in FIG. 3. Note that the gaps in the data as a function of diffraction angle in FIG. 3 are due to the deletion of the peaks for $BaAl2S4$ (II). As can be seen from the data, the fit of the refined structure to the experimental data is with the peaks attributable to $BaAl2S4$ (II) deleted is good. The diffraction pattern for $BaAl4S7$ (II) is similar to that of $BaAl2S4$ (II), except that there is no diffraction peak at 23.3° and there is a significantly more intense peak at 16.8°.

For films that comprise a mixture of $BaAl2S4$ (I), $BaAl2S4$ (II) and $BaAl4S7$ (II), it is possible to approximately determine the relative abundance of the phases using the x-ray diffraction data. For example, it has been reported by B. Eisenmann et al in Materials Research Bulletin Vol. 17 (1982) page 1169 in a determination of the crystal structure of $BaAl2S4$ (I) that it has a diffraction peak at 15.7° and 23.3° but no diffraction peak at 16.8°. The diffraction pattern for $BaAl2S4$ (II) has no diffraction peak at 15.7°, but has peaks at both 16.8° and 23.3°. Finally, the diffraction pattern for $BaAl4S7$ (II) has no diffraction peaks at 15.7° or 23.3°, but has a peak at 16.8°. With this information, and the ratio of diffraction intensities for BaAl2S4 (I) for the 15.7° and 23.3° peaks from the published x-ray diffraction data for this compound, the contribution to the intensity for the 23.3° peak from BaAl2S4 (I) can be subtracted. With this correction, the remaining intensity of the 23.3° peak can be compared to that of the 16.8° peak to determine the relative ratio of the concentrations of BaAl2S4 (II) and BaAl4S7 (II). The relative concentration of BaAl2S4 (I) can be determined from the intensity of the 15.7° peak relative to the same peak for a sample that consists only of this phase. As a final step, the information obtained can be combined to determine the absolute concentration of each phase in the sample, assuming that no other phases are present in significant concentration and that the sample thickness is constant.

Example 3

Figure 4:
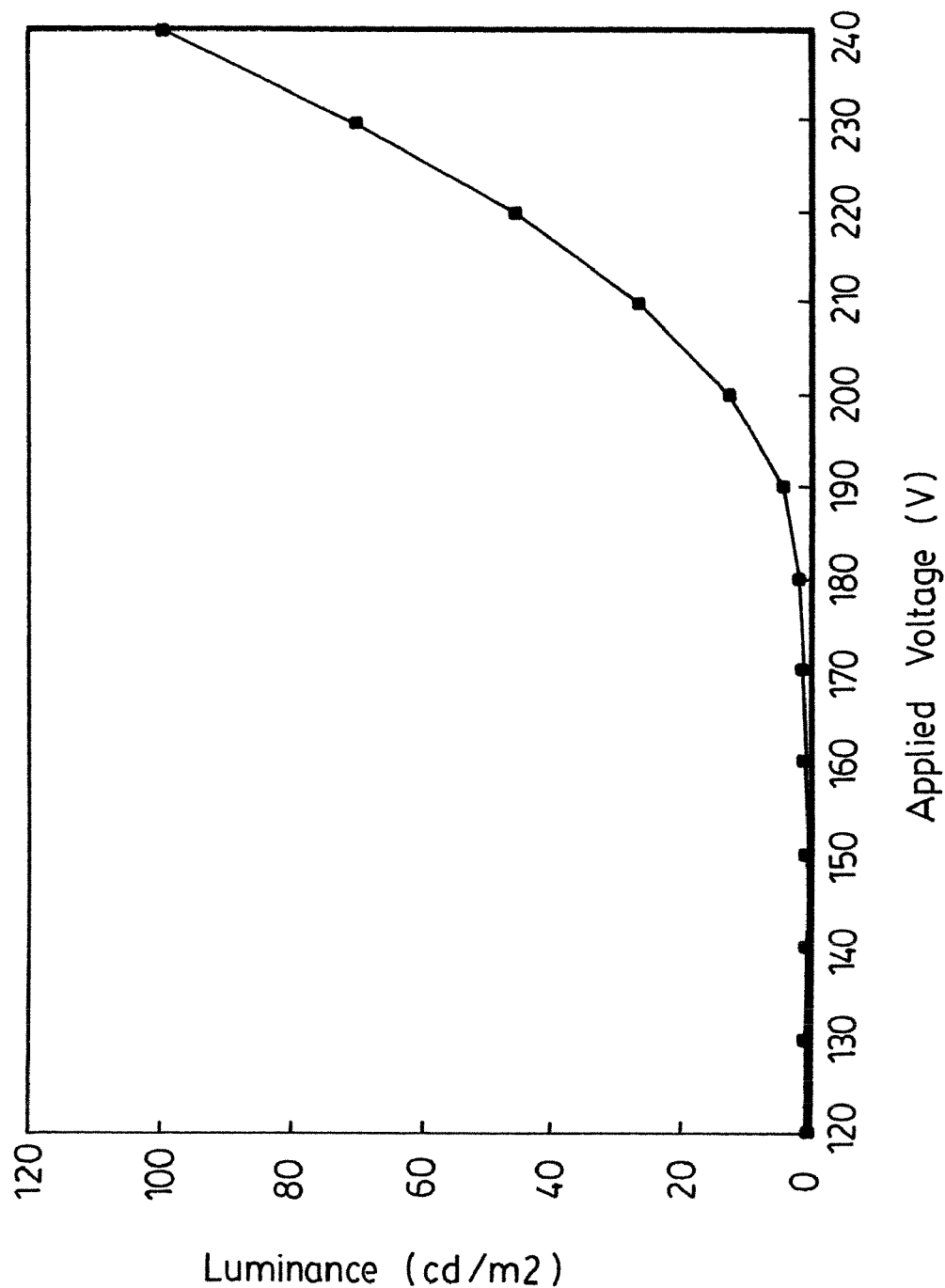
FIG. 4 shows the luminance as a function of applied voltage for an electroluminescent device with a phosphor film consisting of $BaAl_2S_4$ (II)

This example shows the performance of a device having a phosphor consisting of a single phosphor phase to achieve a sharp luminance turn-on at the threshold voltage for the device and a linear increase in luminance above the threshold voltage. An electrode layer and a thick dielectric layer comprising lead magnesium niobate overlaid with a smoothing layer comprising lead zirconate-titanate for an electroluminescent device was fabricated on a five centimeter by five centimeter glass substrate according to the methods taught in U.S. Pat. No. 6,919,126 which is hereby incorporated into this application in its entirety. A 100 nanometer thick layer of barium titanate was deposited on the smoothing layer using the methods taught in U.S. patent application Ser. No. 6,589,674 which is also hereby incorporated into this application its entirety. A 70 to 80 nanometer thick barium tantalate layer followed by a 20 to 30 nanometer thick alumina layer were deposited on the barium titanate layer using a sputtering process. Next a phosphor film consisting of a 0.49 micrometer thick layer of BaAl2S4 was deposited on top of the partially fabricated electroluminescent device using electron beam evaporation. Four electron beam sources were used for the deposition, two containing aluminum sulfide and the remaining two containing barium magnesium sulfide having an atomic ratio of magnesium to magnesium plus barium of about 0.65 and doped with 2 atomic percent europium sulfide. The deposition chamber was fitted with a liquid nitrogen cooled cold finger to minimize the concentration of oxygen-containing and other deleterious species in the deposition chamber during the deposition. Hydrogen sulfide was injected into the deposition chamber from close range at the deposition sources according to the methods of U.S. provisional patent application 60/484,290 (the disclosure of which is hereby incorporated in its entirety) during the deposition at a rate of about 250 sccm to maintain a system pressure of 0.001 Pascals, The deposition substrate was held at a set-point temperature of 512° C. measured behind the substrate during the deposition. The actual substrate temperature was significantly lower because the substrates were radiantly heated from their rear side. The deposition rate was 12 Angstroms per second and the total deposited thickness was about 0.46 micrometers. Following deposition the device with the deposited phosphor film was heated to and held at a temperature of about 620° C. under a mixture of 10% by volume of oxygen in nitrogen at atmospheric pressure for about 75 minutes to ensure saturation of the underlying dielectric layers with oxygen without substantial oxidation of the phosphor layer and then heated further to a temperature of about 740° C. under nitrogen for a further 75 minutes before cooling to ambient temperature. A similar phosphor was deposited on a silicon wafer and thermally treated under nitrogen at 750° C. for about 5 minutes and then set aside for powder x-ray diffraction analysis and elemental analysis using energy dispersive x-ray analysis (EDX). The EDX analysis showed the ratio of the atomic concentration of aluminum to the atomic concentration of barium in the phosphor film to be about 3.5:1.The electroluminescent device was completed by depositing a 50 nanometer thick aluminum nitride layer and an ITO layer to provide a second electrode. The device was tested by applying repeated alternating polarity voltage pulses of a specified voltage and a pulse width of 30 microseconds at a pulse repetition rate of 240 Hz. The luminance versus voltage for this device is shown in FIG. 4. From FIG. 4 it can be seen that the onset of blue luminance occurred at a threshold voltage of about 180 volts and that the luminance increased slowly with increasing voltage above the threshold voltage to about 100 candelas per square meter at 240 volts (60 volts above the threshold voltage).

X-ray diffraction analysis was conducted on the phosphor layer deposited under the same conditions on the silicon wafer after it was heat treated in a belt furnace under nitrogen at a peak temperature of about 750° C. for about 5 minutes. It showed the phosphor film to consist almost exclusively of BaAl2S4 (II). X-ray diffraction analysis of the phosphor layer on the device through its ITO layer showed that it also consisted substantially of BaAl2S4 (II).

Example 4

This example illustrates the need to have the phosphor phases homogeneously mixed when more than one phase is present. An electroluminescent device similar to that of Example 3 was constructed except that the phosphor was deposited using barium magnesium sulfide sources having an atomic ratio of magnesium to magnesium plus barium of about 0.5 rather than 0.65 and doped with 3 atomic percent rather than 2 atomic percent of europium sulfide. The vacuum deposition atmosphere also had a different partial pressure of oxygen-containing species but this could not be precisely measured. It is believed that the crystallization of the films is significantly influenced by the presence of these oxygen-containing species and by the substrate temperature during the deposition process. The ratio of crystalline species in the phosphor film can be adjusted by judicious control over the partial pressures of these species in the deposition atmosphere and by adjustment of the substrate temperature during deposition.

Figure 5:
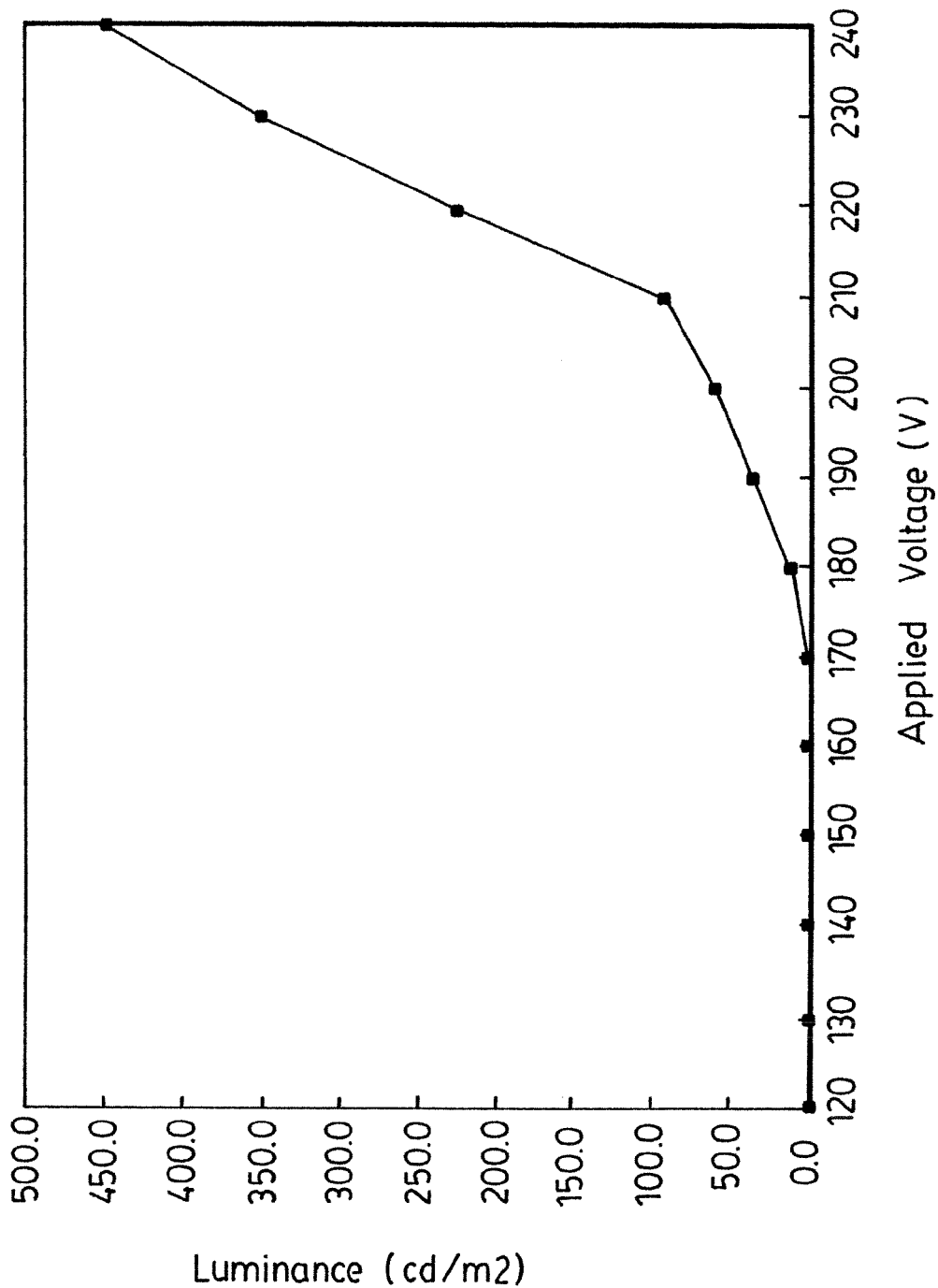
FIG. 5 shows the luminance as a function of applied voltage for an electroluminescent device with a phosphor film consisting of $BaAl_2S_4$ (II) and $BaAl_4S_7$ (II)

The electroluminescent device was subject to testing in the same manner as the device of example 3.The luminance as a function of voltage is shown in FIG. 5. As can be seen from the data, the onset of luminance was at about 175 volts and the luminance increased at first slowly beyond this voltage to about 100 candelas per square meter at about 210 volts and then significantly more rapidly above this voltage to about 500 candelas per square meter at 240 volts (60 volts above the threshold voltage). A phosphor film deposited using the same deposition and heat treatment parameters on a silicon wafer was analyzed using x-ray diffraction and found to comprise both BaAl2S4 (II) and BaAl4S7 (II).

The gradual turn-on of the luminance above the threshold voltage was due to different threshold voltages and different rates of luminance increase as a function of voltage for the two phosphor phases. Microscopic examination of a similar phosphor revealed that certain areas of the phosphor surface illuminated first with a relatively low rate of luminance increase as the voltage was increased, and then at a higher threshold voltage, the remaining areas lit up and the luminance thereafter increased rapidly with increasing voltage.

The former areas were found to consist primarily of BaAl2S4 (II) and the latter areas were found to consist primarily of BaAl4S7 (II).

The slow initial increase in the luminance is undesirable, since for reasons explained in U.S. Pat. No. 6,448,950, which is hereby incorporated into this application in its entirety, the power consumption of an electroluminescent display addressed using passive matrix addressing and having a gradual turn-on of the luminance above the threshold voltage is unacceptably high.

Example 5

Figure 6:
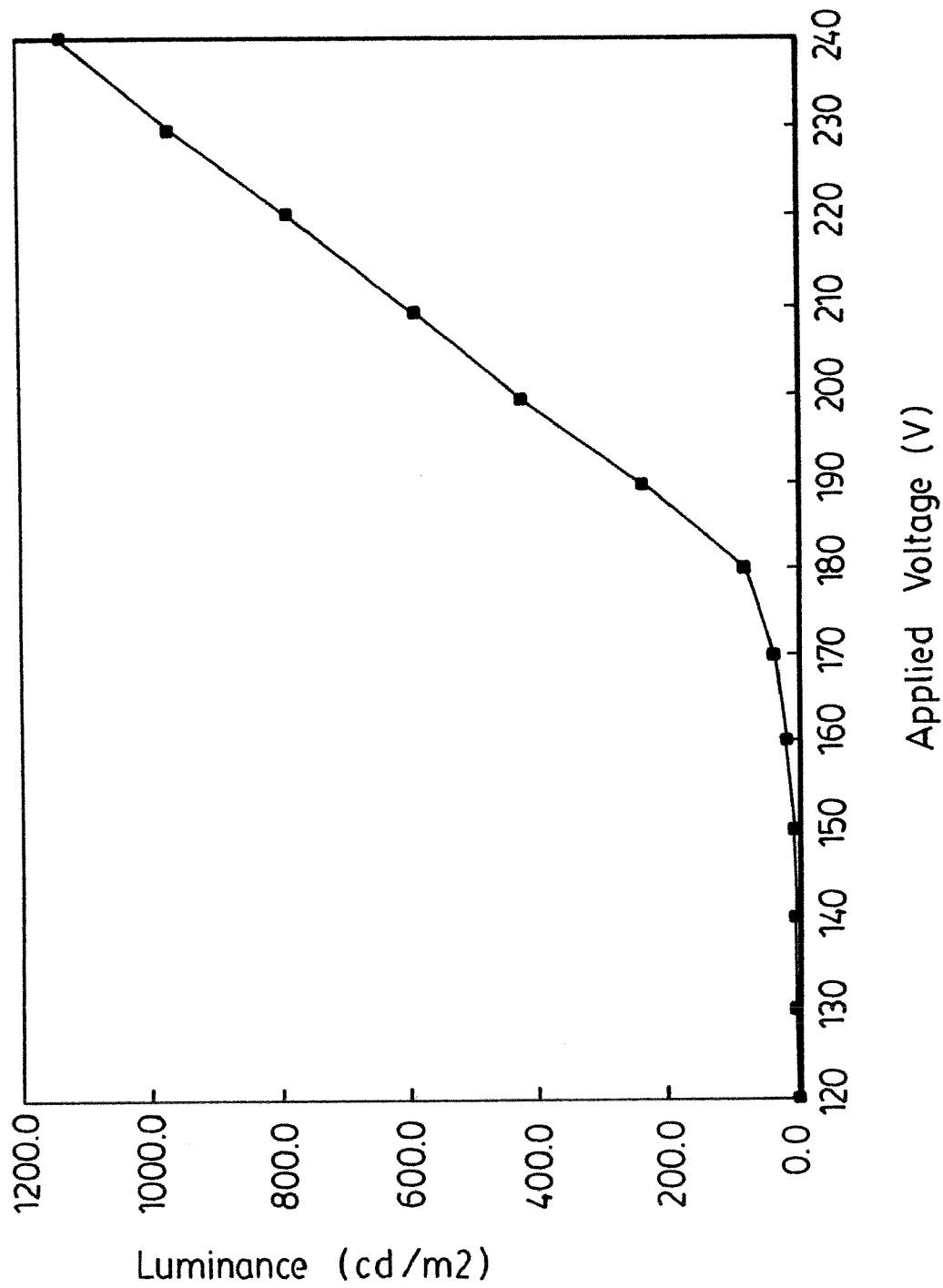
FIG. 6 shows the luminance as a function of applied voltage for an electroluminescent device with a phosphor film consisting primarily of $BaAl_4S_7$ (II) with a smaller amount of $BaAl_2S_4$ (II)

This example shows the high radiance realizable from a device having a phosphor consisting of a mixture of BaAl2S4 (II) and BaAl4S7 (II) where the ratio of concentration BaAl4S7 (II) to the sum of the concentrations of both phases is greater than 0.5 and when the two phases are homogeneously mixed. Such a phosphor does not have CIE coordinates suitable for blue sub-pixels in a full colour video display without heavy optical filtering of its output to achieve an acceptable blue colour. However it is useful as a high radiance excitation phosphor for red and green sub-pixels using a colour conversion layer as described in U.S. Pat. No. 7,417,368 (the disclosure of which is incorporated herein in its entirety). The quantum efficiencies of the green and red colour conversion phosphor are not greatly dependant on the colour spectrum of the emission from the excitation phosphor provided that it lies in the blue to blue green part of the optical spectrum. An electroluminescent device similar to that of Example 3 was constructed except that the phosphor was deposited using a significantly lower hydrogen sulfide flow and different partial pressures of oxygen-containing species originating in part from the source materials during the deposition process. The electroluminescent device was subject to testing in the same manner as the device of example 3. The luminance as a function of voltage is shown in FIG. 6. As can be seen from the data, the onset of luminance was at about 165 volts and the luminance increased approximately linearly with voltage to about 800 candelas per square meter at about 225 volts (60 volts above the threshold voltage). The CIE y coordinate was about 0.18. A phosphor film deposited using the same deposition and heat treatment parameters on a silicon wafer was analyzed using x-ray diffraction and found to comprise about 35% BaAl2S4 (II) and 65% BaAl4S7 (II).

Example 6

Figure 7:
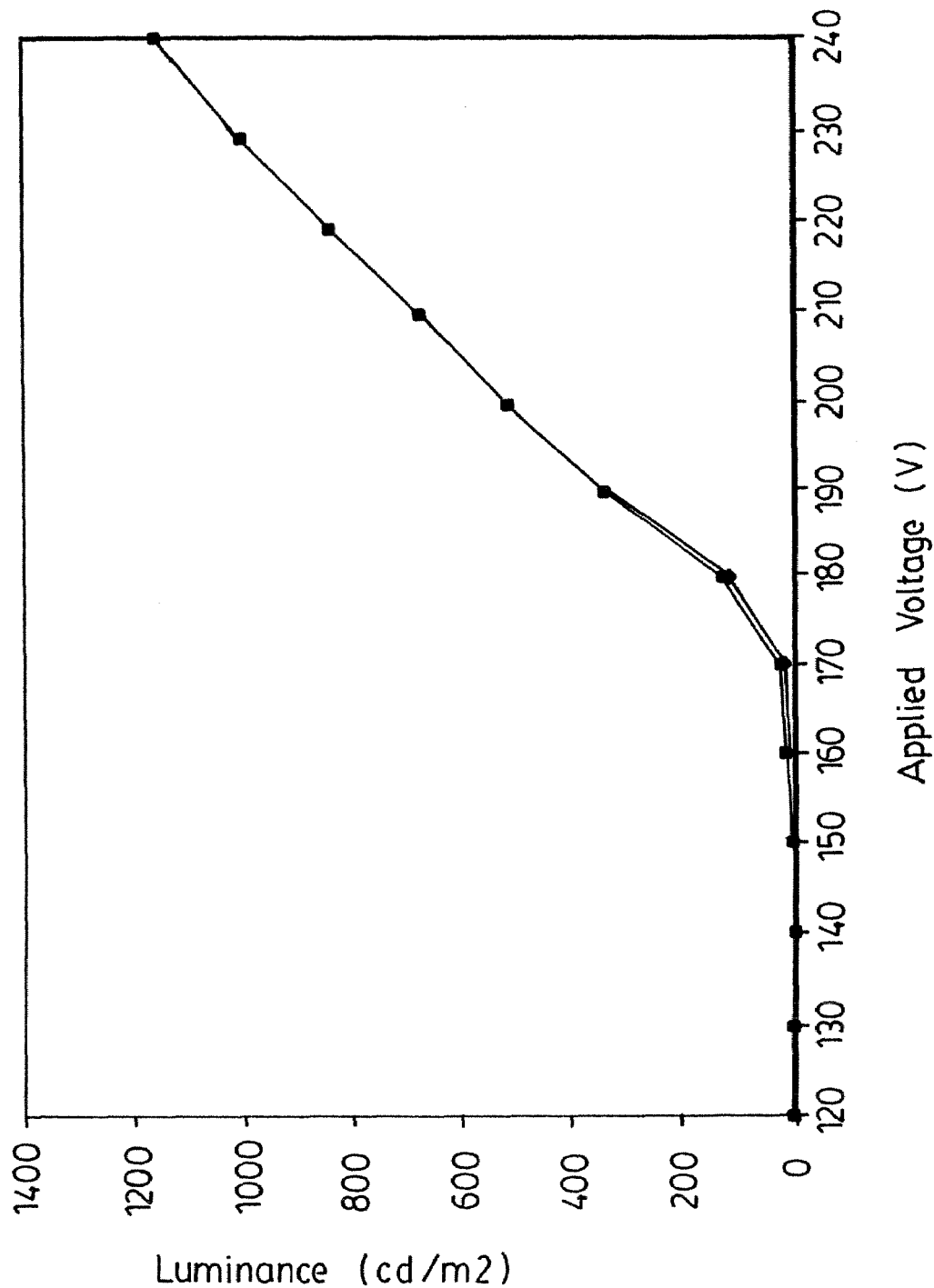
FIG. 7 shows the luminance as a function of applied voltage for an electroluminescent device with a phosphor film consisting of about equal proportions of $BaAl_2S_4$ (I) and $BaAl_2S_4$ (II)

This example shows that both a high luminance and an excellent blue CIE y coordinate can be realized from a device having a phosphor consisting of a homogeneous mixture of about 50% BaAl2S4 (I) and 50% BaAl2S4 (II). In this case the luminance is significantly higher than would be expected based on the additive contribution from the two phases. There is a synergistic benefit due to an interaction between the two phases. An electroluminescent device similar to that of example 3 was constructed except that the phosphor was deposited under partial pressures of oxygen-containing species different from those of examples 3, 4 and 5.The device was subject to testing as described in example 3.The luminance as a function of voltage is shown in FIG. 7. As can be seen from the data, the onset of luminance was at a threshold voltage of luminance increased linearly and very quickly above the threshold voltage of 170 volts to a luminance of 1000 candelas per square meter at 230 volts or 60 volts above the threshold voltage. A similar phosphor film deposited on a silicon wafer was subject to x-ray diffraction analysis and shown to consist of about 50% BaAl2S4 (I) and 50% BaAl2S4 (II).

Example 7

This example shows the additive effect of radiance and colour coordinates for a number of devices having a phosphor film composition comprised of $BaAl_2S_4$ (II) and $BaAl_4S_7$ (II) in different ratios. About 50 sample devices similar to those of examples 3, 4, 5 and 6 were constructed, the x-ray diffraction patterns of phosphor films with composition similar to that of the samples were measured, and from the data, the relative concentrations of $BaAl_2S_4$ (I), $BaAl_2S_4$ (II) and $BaAl_4S_7$ (II) were determined. Due to variations in the process conditions for phosphor deposition such as in the local substrate temperature, or the local partial pressure of vapour species present during the deposition, the ratios of crystal phases present in the phosphor films for these devices varied considerably. From this set of devices a subset of devices was selected that had phosphors containing only $BaAl_2S_4$ (II) and $BaAl_4S_7$ (II) in significant quantity. The luminance and x and y CIE colour coordinates of the samples were measured up to a driving voltage of 240 volts. The colour coordinate data and the CIE 1931 chart were used to determine the peak wavelength of the emission spectra form these samples with the assumption that the spectral emission was a broad symmetry peak centered at the peak wavelength. This was done by extending a line from the x,y point on the colour chart so that it was perpendicular to the boundary of the chart representing monochromatic radiation. The intersection with the line with the boundary was taken to be the peak wavelength. The luminance values were then converted to areal radiance values using a conversion table for relative luminosity efficiency and a conversion factor at 550 nanometers of 4.6 watts per candela and the peak wavelength using the assumption that the emission occurred at the peak wavelength. This is an approximate calculation, but the accuracy is quite good if the width of the emission peak is not too broad.

Figure 8:
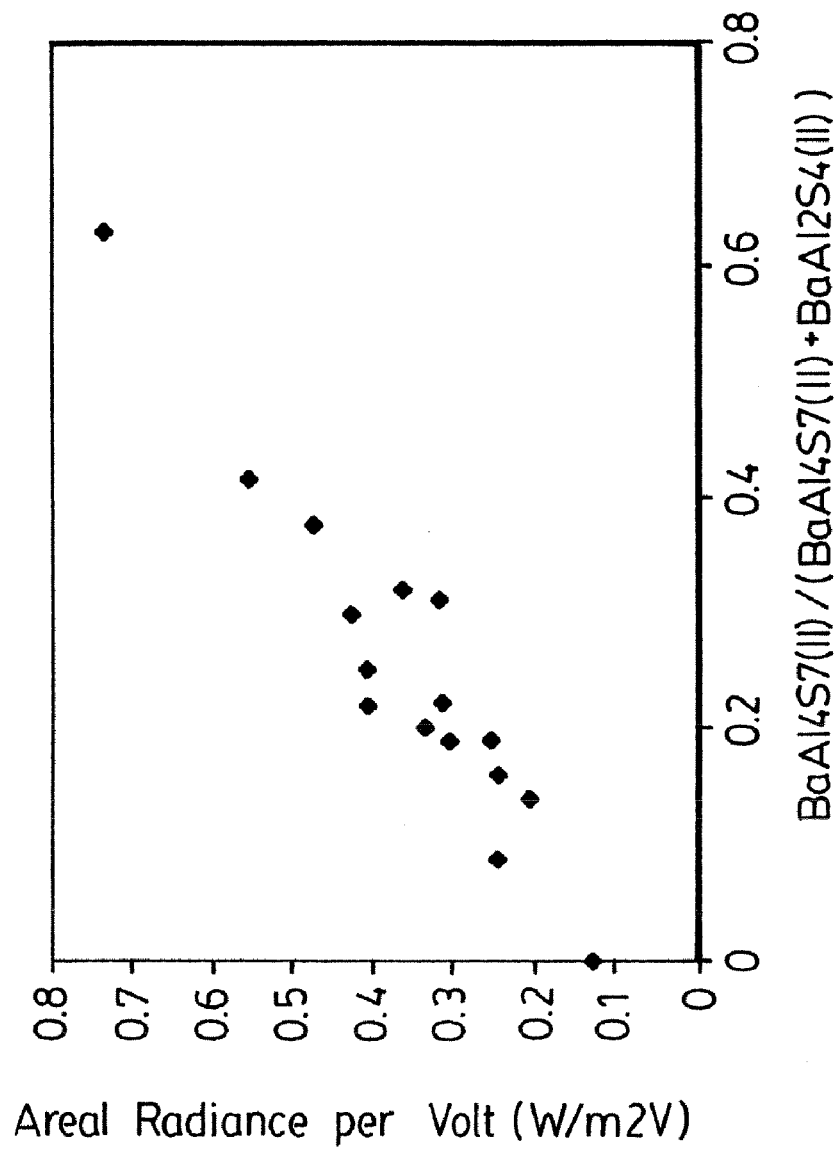
FIG. 8 shows the dependence of the areal radiance of electroluminescent devices having phosphor films containing $BaAl_2S_4$ (II) and $BaAl_4S_7$ (II) as a function of the relative concentration of the two phases.

FIG. 8 shows the slope of the areal radiance curve near the maximum applied voltage as a function of the fractional amount of $BaAl_4S_7$ (II) in the phosphor film compared to the sum of the amounts of $BaAl_2S_4$ (II) and $BaAl_4S_7$ (II) in the phosphor film. The left hand side of the graph corresponds to pure $BaAl_2S_4$ (II) and the right hand side corresponds to pure $BaAl_4S_7$ (II). As can be seen from the data the radiance increases in a linear fashion as the fraction of $BaAl_4S_7$ (II) increases showing the additive contribution to the radiance from the two phases. Although no devices with the pure $BaAl_4S_7$ (II) were made, the data can be extrapolated to indicate that the radiance slope for pure $BaAl_4S_7$ (II) is about 1 watt per square meter per volt above the threshold voltage, whereas the radiance slope for $BaAl_2S_4$ (II) is only about 0.15 watts per square meter per volt above the threshold voltage. For comparison purposes, the radiance slope for $BaAl_2S_4$ (I) is about 0.4 watts per square meter per volt above the threshold voltage. FIG. 9 shows the CIE y coordinate as a function of the fraction of $BaAl_4S_7$ (II). The y coordinate value follows the additive radiance contribution from the phases, taking into account the y value for each phase.

Example 8

This example shows the synergistic effect on radiance for a number of devices having a phosphor film consisting of $BaAl_2S_4$ (I) and $BaAl_2S_4$ (II) in different ratios. A maximum radiance is obtained for approximately equal fractions of each phase. From the approximately 50 devices of example 7, a subset of devices was selected that had phosphors containing only $BaAl_2S_4$ (I) and $BaAl_2S_4$ (II) in significant quantity. The luminance and the x and y CIE coordinates for the samples was measured and the radiance was calculated as for example 7. FIG. 10 shows the slope of the areal radiance curve near the maximum applied voltage as a function of the fractional amount of $BaAl_2S_4$ (I) in the phosphor film compared to the sum of the amounts of $BaAl_2S_4$ (I) and $BaAl_2S_4$ (II) in the phosphor film. The left hand side of the graph corresponds to pure $BaAl_2S_4$ (II) and the right hand side corresponds to pure $BaAl_2S_4$ (I). As can be seen from the data the radiance reaches a maximum for approximately equal concentrations of the two phases, showing a synergistic effect between the phases on the radiance. This behaviour is very different from that of the two phase mixtures of example 7. The y coordinate of each phase is about the same and the y coordinate for the mixtures was constant as a function of the ratio of the phases.

Although preferred embodiments of the invention have been described herein in detail, it will be understood by those skilled in the art that variations may be made thereto without departing from the spirit of the invention.

The invention claimed is:

1. A rare earth element activated barium thioaluminate phosphor film having a face centered orthorhombic crystal lattice structure.

2. The phosphor film of claim 1, wherein said rare earth element is selected from the group consisting of europium and cerium.

3. The phosphor film of claim 2, wherein said rare earth element is europium.

4. The phosphor film of claim 2, wherein said phosphor compound is $BaAl_2S_4$ (II).

5. The phosphor film of claim 2, wherein said phosphor compound is $BaAl_4S_7$ (II).

6. The phosphor film of claim 2, wherein said phosphor film additionally comprises $BaAl_2S_4$ (I) having a cubic crystal lattice structure.

7. The phosphor film of claim 2, wherein said phosphor film additionally comprises $BaAl_4S_7$ (I) having an orthorhombic crystal lattice structure.

8. The phosphor film of claim 2, wherein said compound further comprises oxygen.

9. The phosphor film of claim 2, wherein said compound further comprises an element M from Group IIA of the Periodic Table of Elements.

10. A rare earth activated phosphor compound $BaAl_2S_4$ (II) having a face centered orthorhombic crystal lattice structure.

11. The compound of claim 10, wherein said lattice constants are a=21.91 Angstroms, b=20.98 Angstroms and c=12.13 Angstroms.

12. The compound of claim 11, wherein 32 $BaAl_2S_4$ (II) molecules are in a crystal unit cell arranged in the space group F d d d.

13. A rare earth activated phosphor compound $BaAl_4S_7$ (II) having a face centered orthorhombic crystal lattice structure.

14. The compound of claim 13, wherein said lattice constants are a=10.6 Angstroms, b=7.3 Angstroms and c=10.5 Angstroms.

15. The compound of claim 14, wherein 4 $BaAl_4S_7$ (II) molecules are in a crystal unit cell arranged in the space group F m m 2.

* * * * *